US012020175B2

(12) United States Patent
Livshitz et al.

(10) Patent No.: US 12,020,175 B2
(45) Date of Patent: *Jun. 25, 2024

(54) BUILDING TRAINING DATA AND SIMILARITY RELATIONS FOR SEMANTIC SPACE

(71) Applicant: Evernote Corporation, Redwood City, CA (US)

(72) Inventors: Eugene Livshitz, San Mateo, CA (US); Alexander Pashintsev, Cupertino, CA (US); Boris Gorbatov, Sunnyvale, CA (US)

(73) Assignee: Bending Spoons S.p.A., Milan (IT)

( * ) Notice: Subject to any disclaimer, the term of this patent is extended or adjusted under 35 U.S.C. 154(b) by 937 days.

This patent is subject to a terminal disclaimer.

(21) Appl. No.: 17/001,311

(22) Filed: Aug. 24, 2020

(65) Prior Publication Data

US 2020/0387815 A1 Dec. 10, 2020

Related U.S. Application Data

(63) Continuation of application No. 15/416,611, filed on Jan. 26, 2017, now Pat. No. 10,755,183.
(Continued)

(51) Int. Cl.
*G06F 17/00* (2019.01)
*G06F 16/33* (2019.01)
(Continued)

(52) U.S. Cl.
CPC ............. *G06N 5/04* (2013.01); *G06F 16/334* (2019.01); *G06F 16/3344* (2019.01); *G06F 40/205* (2020.01); *G06N 20/00* (2019.01)

(58) Field of Classification Search
CPC .......... G06N 5/04; G06N 5/046; G06N 20/00; G06N 7/01; G06F 16/334; G06F 16/3344;
(Continued)

(56) References Cited

U.S. PATENT DOCUMENTS 10,755,183 B1 * 8/2020 Livshitz .............. G06F 16/3344
11,494,418 B2 * 11/2022 Banisakher ........... G06F 40/216
(Continued)

OTHER PUBLICATIONS

Bunescu et al., "Using Encylopedia Knowledge for Named Entity Disambiguation", in Proceedings of the 11th Conference of the European Chapter of the Association for Computational Linguistics, pp. 9-16, 2006.
(Continued)

*Primary Examiner* — Greta L Robinson
(74) *Attorney, Agent, or Firm* — Morgan, Lewis & Bockius LLP

(57) ABSTRACT

A method and system for selecting data from a source text corpus for training a semantic data analysis system. The method includes selecting an item of the text corpus, wherein the item includes at least one section. The method includes extracting a section of the at least one section of the item. The method also includes determining a length of the section of the at least one section of the item. Based on the length of the section being greater than a predetermined amount, the method includes subdividing the section into a plurality of fragments. Each fragment of the plurality of fragments is deemed to be similar to each other. Further, the method includes building a training set based on the plurality of fragments. The training set is used to train the semantic data analysis system.

20 Claims, 3 Drawing Sheets

Related U.S. Application Data

(60) Provisional application No. 62/287,932, filed on Jan. 28, 2016.

(51) Int. Cl.
*G06F 40/205* (2020.01)
*G06N 5/04* (2023.01)
*G06N 20/00* (2019.01)

(58) Field of Classification Search
CPC .... G06F 40/205; G06F 40/137; G06F 40/166; G06F 40/216; G06F 40/30; G06F 40/131
See application file for complete search history.

(56) References Cited

U.S. PATENT DOCUMENTS

| | | | |
|---|---|---|---|
| 2012/0016664 A1* | 1/2012 | Ando | G06F 40/284 704/9 |
| 2013/0091420 A1* | 4/2013 | Shin | G06Q 30/02 715/255 |
| 2013/0145255 A1* | 6/2013 | Zheng | G06F 16/986 715/234 |
| 2015/0046150 A1* | 2/2015 | Nakamura | G06F 40/211 704/9 |

OTHER PUBLICATIONS

Livshitz et al., Non-Final Office Action, U.S. Appl. No. 15/416,611, dated Dec. 2, 2019, 9 pgs.
Livshitz et al., Notice of Allowance, U.S. Appl. No. 15/416,611, dated Apr. 20, 2020, 7 pgs.

* cited by examiner

|     | F1 | F2 | F3  | F4  | F5 | F6 | F7 | ... |
|-----|----|----|-----|-----|----|----|----|-----|
| F1  |    | 1  | n/a | n/a | 0  | 0  | 0  | 0   |
| F2  |    |    | n/a | n/a | 0  | 0  | 0  | 0   |
| F3  |    |    |     | 1   | 0  | 0  | 0  | 0   |
| F4  |    |    |     |     | 0  | 0  | 0  | 0   |
| F5  |    |    |     |     |    | 1  | 1  | 0   |
| F6  |    |    |     |     |    |    | 1  | 0   |
| F7  |    |    |     |     |    |    |    | 0   |
| ... |    |    |     |     |    |    |    |     |

FIG.2

BUILDING TRAINING DATA AND SIMILARITY RELATIONS FOR SEMANTIC SPACE

CROSS-REFERENCE TO RELATED APPLICATIONS

This application is a continuation of U.S. patent application Ser. No. 15/416,611, entitled "BUILDING TRAINING DATA AND SIMILARITY RELATIONS FOR SEMANTIC SPACE," filed Jan. 26, 2017, which claims priority to U.S. Prov. App. No. 62/287,932, filed Jan. 28, 2016, and entitled "BUILDING TRAINING DATA AND SIMILARITY RELATIONS FOR SEMANTIC SPACE," both of which are incorporated by reference herein.

TECHNICAL FIELD

This application is directed to the field of data analysis and search, and more particularly to the field of creating dataset and associated similarity relation between data snippets for training a semantic data analysis system.

BACKGROUND OF THE INVENTION

Two aspects of contemporary search engines are a natural language enabled user interface for entering flexible and user-friendly queries and a semantic search, which understands user intent and recognizes contextual meaning of search terms. Semantic search and question answering systems and methodologies where queries may be entered as natural language phrases have been developed over the past decades and resulted in numerous general purpose as well as content and information source specific desktop and mobile semantic search and question answering engines.

Semantic search portals include Bing, Google Search with Knowledge Graph, Facebook Graph Search, International Digital Media Archive, Legal Intelligence, SILVIA (for images), Thinkglue (for video), Wolfram Alpha, etc., while mobile and desktop semantic search utilities include an embedded Search in Windows Explorer, Apple Siri, Google Search for Android, Amazon Alexa, Copernic and other engines. For example, searching a Documents folder on a Windows PC with an enabled natural language search option allows a user to find files satisfying certain natural language queries, such as "images last week" or "large pdf", pertaining to various types of personal content, size, creation and update time of items and other content parameters.

Semantic search methodologies include operations with advanced types of metadata, such as RDF path traversal or OWL inference using World Wide Web Consortium's specifications for Resource Description Framework and Web Ontology Language (both are considered elements of the Semantic Web), Keyword to Concept Mapping, various methods of fuzzy logics, Explicit Semantic Analysis (ESA), Generalized Vector Space Model (GVSM), etc. Expanding semantic search boundaries, improving efficiency and adapting semantic search technologies to increasing set of applications remains an actual task for academic and industry researchers and for technology companies.

Three requirements for efficient creation and functioning of general purpose and specialized semantic search engines are building comprehensive and reliable training datasets, creating adequate models of extracted semantic information, and extracting semantic information from the data sets. Frequently used candidates for training data sets at the start of building semantic engines include WordNet, Open Directory Project and other resources satisfying RDF standards, as well as Lexical markup framework, UNL Programme, etc.

Another popular source of comprehensive text collections is Wikipedia, currently available in 291 languages. Wikipedia provides a unified structure for articles and internal links therein. Wikipedia articles possess, for the most part, high quality content; articles with questionable quality, objectiveness or completeness are normally supplied with editorial prefixes, making it easy to automatically identify and exclude such articles from a dataset; additionally, a history of creation and editing of an article may offer a supplementary evidence to assess validity of the article. Expanding the corpora of reference materials to Wikipedia articles, known as the wikification technique, have already proven it fruitful in various Natural Language Processing studies. One recent example included supervised learning on anchor texts in Wikipedia for the Named Entity Disambiguation task under the entity linking approach.

Notwithstanding significant progress in utilizing various linguistic corpora for training, the problem of isolating semantic textual units in training datasets remains largely an open-ended task. For example, systematic usage of wikification for semantic search has been limited to superficial works that treated Wikipedia articles as a whole and ignored significant noise created by this approach.

Accordingly, it is desirable to develop mechanisms for building large training datasets for semantic search using various information sources.

SUMMARY OF THE INVENTION

According to the system described herein, selecting data from a source text corpus for training a semantic data analysis system includes selecting an item of the text corpus, validating the item, extracting at least one section of the item, determining a length of each of the at least one section of the item, and subdividing each of the sections having a length greater than a predetermined amount into a plurality of fragments that are deemed to be similar. The predetermined amount may be approximately twice a size of a fragment. A fragment may have approximately 100 words or between 40 and 60 words. Fragments from different items may be deemed to be dissimilar. Fragments from sections of the same item may be deemed to be undefined with regard to similarity. Sections having a length less than the predetermined amount may be ignored. Validating the item may include parsing editorial notes and other accompanying data. The source text corpus may be Wikipedia. The item may be an article.

According further to the system described herein, a non-transitory computer readable medium contains software that selects data from a source text corpus for training a semantic data analysis system. The software includes executable code that selects an item of the text corpus, executable code that validates the item, executable code that extracts at least one section of the item, executable code that determines a length of each of the at least one section of the item, and executable code that subdivides each of the sections having a length greater than a predetermined amount into a plurality of fragments that are deemed to be similar. The predetermined amount may be approximately twice a size of a fragment. A fragment may have approximately 100 words or between 40 and 60 words. Fragments from different items may be deemed to be dissimilar. Fragments from sections of the same item may be deemed to be undefined with regard to similarity. Sections having a length less than the predetermined amount may be ignored. Validating the item may include parsing editorial notes and other accompanying data. The source text corpus may be Wikipedia. The item may be an article.

The proposed system treats a training set for semantic search as a collection of textual fragments extracted from large corpora of validated materials, supplemented with a semantic similarity relation between fragments, which is defined by relative positions of the fragments within each article. Subsequently, a semantic space is defined by mapping of the training set into a multi-dimensional vector space that optimally approximates the similarity relation for given metrics in the vector space.

Sources for extracting textual fragments comprising training datasets may include online encyclopedias, such as Wikipedia or other publications (over 200 popular online encyclopedias are published online), the above-mentioned information sources (WordNet, Lexical Markup Network, etc.), various industry wide and knowledge domain specific resources, book collections, etc. For the discussion herein, an example of Wikipedia is used, without limitation, with references to other information sources as necessary.

In contrast with some previous research based on wikification where either full articles or small snippets of text were analyzed for semantic properties, the proposed system splits validated articles into regular fragments of roughly equal lengths (in an embodiment, 50-100 words per fragment) and defines a fuzzy ternary similarity relation with three conventional values <yes, no, unknown>=<1, 0, n/a> depending on whether two fragments have been extracted from the same section of a Wikipedia article. Specifically, two fragments are considered:

Semantically similar if they have been extracted from the same section of an article;
Semantically dissimilar if they have been extracted from different articles;
Similarity is not assessed (unknown) if they have been extracted from different sections of the same article.

Short articles and sections of articles, tables of content, references and other auxiliary portions of articles are ignored.

The process of building a semantic training dataset includes the following:

1. A desired size of the dataset, i.e. a required count of fragments of articles, is estimated. In one embodiment, an instance of a semantic space is built based on learning from a sample of approximately 20 million fragments.

2. A random Wikipedia article is chosen and validated for consistency by parsing editorial notes and, if needed, other accompanying data. Only valid articles are further processed. Information sources other than Wikipedia may have different validity markers that are processed according to corresponding rules.

3. If an article contains sections (which may be judged, in the case of Wikipedia, by the presence of the Contents section), each section is extracted as a separate entity; otherwise, the entire article is considered a single section.

4. A rough estimate of section length is calculated for each section by dividing length of an article in symbols by an average predefined desired length of a fragment, as explained elsewhere herein. In an embodiment, a default average fragment length in English texts is set to 500 symbols, which corresponds to approximately 100 words (an average word length in the English language is 5.1 letters). In another embodiment, a preferred default fragment length is between 40 and 60 words of English text.

5. Sections that are significantly shorter than the double fragment length are ignored because contributing to positive semantic similarity values requires at least two fragments per section of an article. This consideration may also cause abandoning of an entire one-section article.

6. For sections satisfying the double fragment length requirement, a total number of fragments into which the section may be partitioned is calculated. For example, with an average fragment length of 100 words, a 220 word section may be split into two fragments each containing between 100 and 120 words depending on additional factors, such as preferably keeping full phrases or lists together and avoiding splitting phrases and lists between adjacent fragments, while a 250 word section may be split into three fragments, 80 to 85 words each.

7. Each section is partitioned into adjacent fragments as explained above. Each fragment is added to the training dataset.

8. A master similarity relation between fragments is augmented using the above fragment data from the current article according to the following rule:
   a. All fragments extracted from the same section of an article are considered semantically close; similarity value between such fragments is set to one (1).
   b. Any two fragments extracted from different articles are deemed semantically unrelated; a similarity value between such fragments is set to zero (0). In other words, fragments added from a currently processed article are considered semantically dissimilar to any fragments previously extracted from other articles.
   c. A semantic relation between any two fragments extracted from different sections of a single article is treated as uncertain; a similarity value between such fragments is set to N/A.

9. Steps 2-8 are repeated until a count of fragments reaches a desired size of the training dataset. Thus, in an above-mentioned embodiment, new articles are selected and processed until 20 million valid fragments are added to the training dataset.

Subsequently, the training step is conducted to map fragments of the training dataset into a multi-dimensional vector space with the purpose to maximize resemblance between the similarity values explained above and the spatial distance between vector images of the fragments according to the semantic mapping.

BRIEF DESCRIPTION OF THE DRAWINGS

Embodiments of the system described herein will now be explained in more detail in accordance with the figures of the drawings, which are briefly described as follows.

FIG. 2 is a schematic illustration of a semantic similarity relation between fragments of articles, according to embodiments of the system described herein.

DETAILED DESCRIPTION OF VARIOUS EMBODIMENTS

The system described herein provides a mechanism for building datasets from various information sources to construct a semantic space, whereby the dataset is a collection of fragments from articles present in various information sources supplemented with a semantic similarity relation between articles based on mutual disposition of the fragments within each article or sections of each article.

Figure 1:
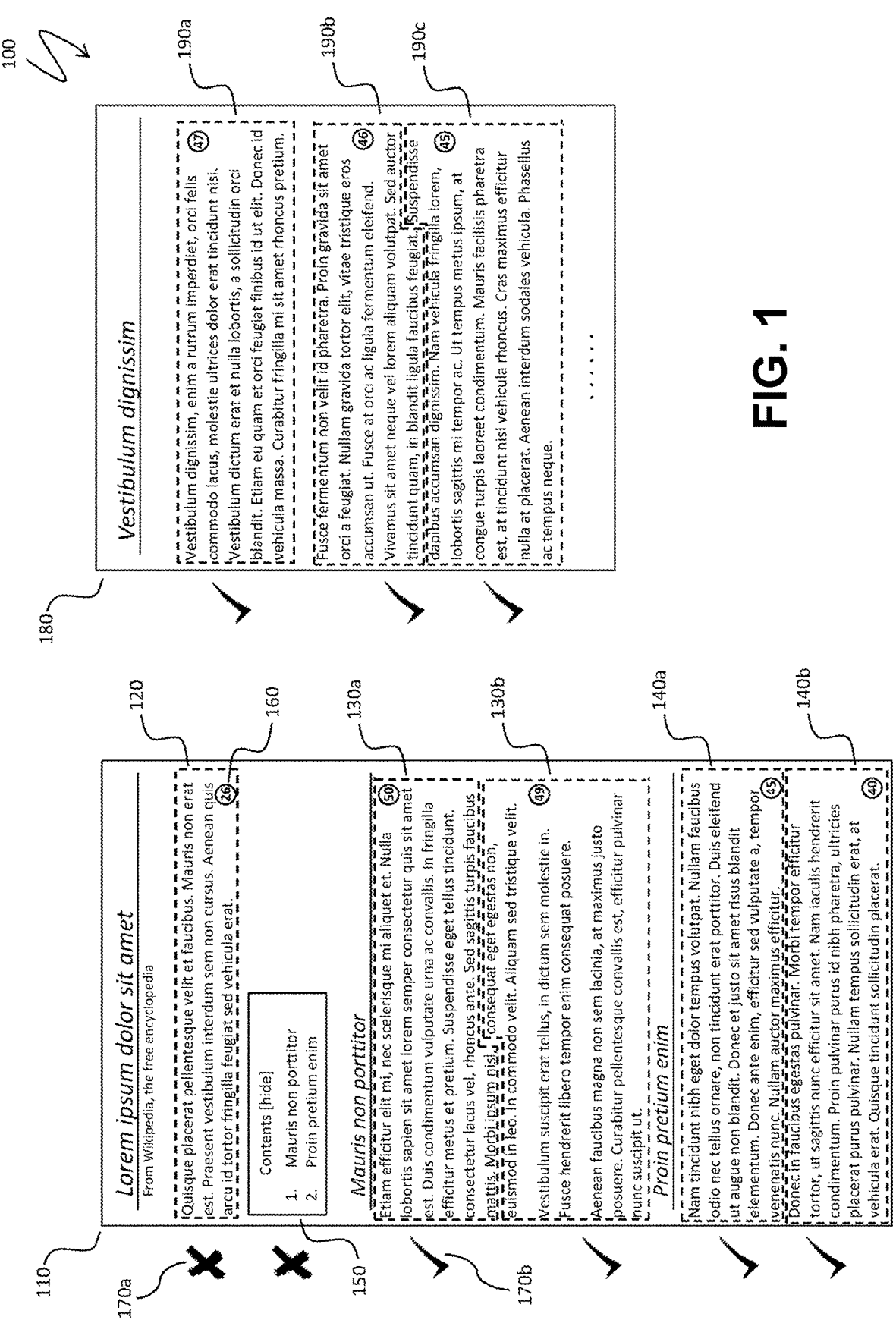
FIG. 1 is a schematic illustration of building a training set from articles, according to embodiments of the system described herein.

FIG. 1 is a schematic illustration 100 of building a training set from articles. A first article 110 is selected from Wikipedia and is split into fragments 120, 130a, 130b, 140a, 140b, and a Contents section 150. Each of the fragments 120, 130a, 130b, 140a, 140b, except the Contents section 150, is supplied with a word count 160. The Contents section 150 is not included as a fragment and the fragment 120 corresponding to a short introductory section of the article 110 is below the required word limit and is also excluded, as illustrated by deletion signs 170a. On the other hand, the fragments 130a, 130b, which form together a first section of the article 110 following the Contents 150, and the fragments 140a, 140b that represent a split of a next section of the article 110, all satisfy a word count requirements (set to 40-60 words per fragment in this example, as explained elsewhere herein) and are added to a training set. Similarly, all three adjacent fragments 190a-190c of another article 180 (generated from an unnamed information source and including one long section), all satisfy the size requirements and are added to the training set.

FIG. 2 is a schematic illustration 200 of a semantic similarity relation between fragments of articles. A matrix 210 of similarity relation may be augmented on the fly when a new article from an available information source is selected and processed, as explained elsewhere herein (see, in particular, FIG. 1 and the accompanying text). A portion of the matrix 210 presented in FIG. 2 illustrates values of semantic similarity relations between the fragments extracted from the articles 110 and 180 in FIG. 1. Specifically, the fragments 130a, 130b (F1 and F2) have been extracted from one section of the article 110; therefore, a similarity value 220 between the fragments 130a, 130b is set to one, as explained elsewhere herein. In contrast, the fragment 140a (F3) was extracted from a different section of the article 110 as the fragment 130a; accordingly, a similarity value 230 between the fragment 130a, 140a is treated as unknown (N/A), as explained elsewhere herein. As to the fragment 130a (F1) and the fragment 190a (F5), the fragments 130a, 190a were extracted from different articles; therefore, similarity a value 240 between the fragments 130a, 190a is set to zero, as explained elsewhere herein. Similarly to the fragments 130a, 130b, 140a, 140b, all three fragments 190a (F5), 190b (F6), 190c (F7) were extracted from one section of the article 180; therefore, all three pairwise similarity values 150, 260, 270 between the fragments 190a, 190b, 190c are set to one.

Figure 3:
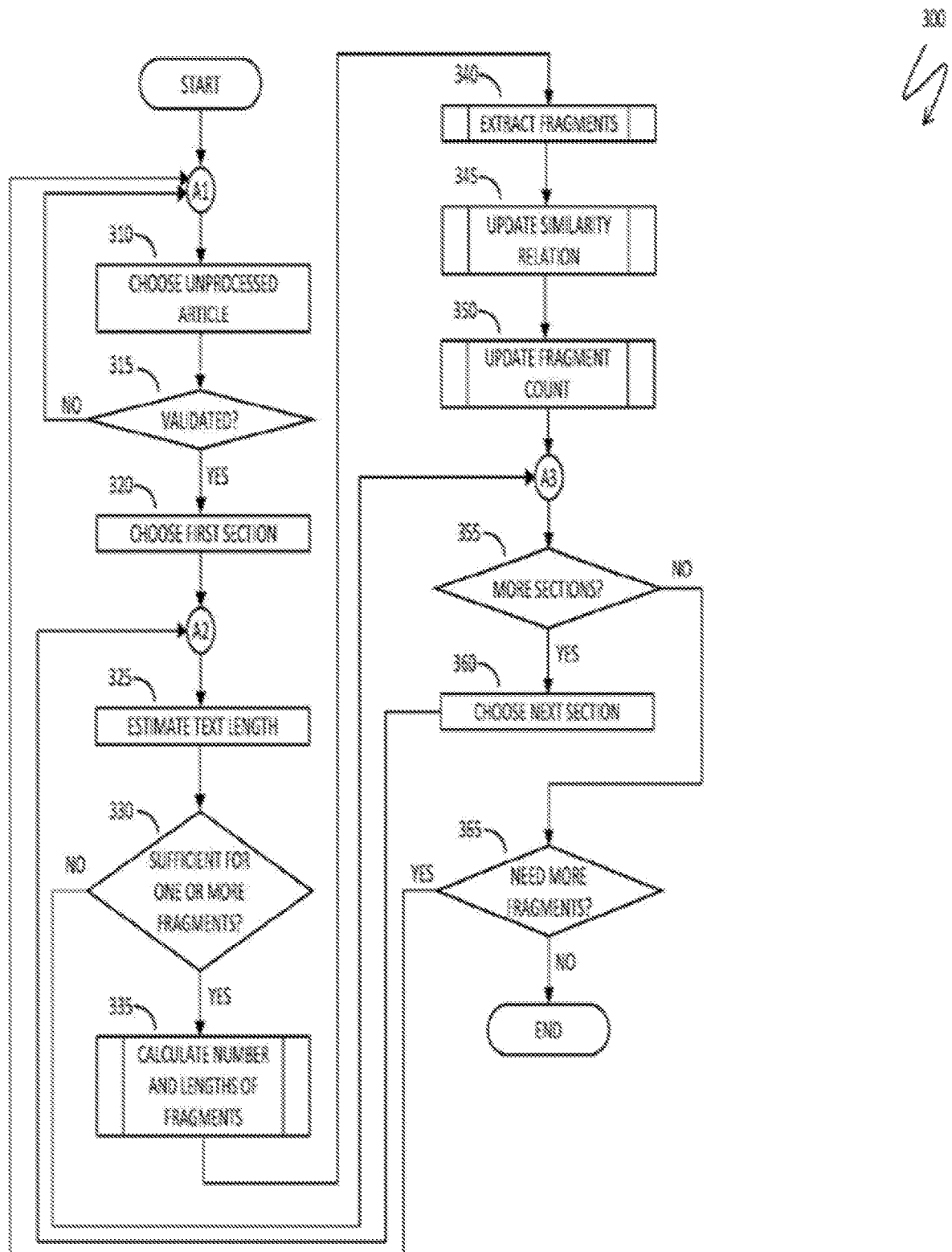
FIG. 3 is a flow diagram illustrating processing performed in connection with building a training dataset, according to embodiments of the system described herein.

Referring to FIG. 3, a flow diagram 300 schematically illustrates processing performed in connection with building a training dataset. Processing starts at a step 310, where the system selects a previously unprocessed article from one of the available information sources. After the step 310, processing proceeds to a test step 315, where it is determined whether the article is validated by, for example, parsing editorial notes and, if needed, other accompanying data, as explained elsewhere herein. If not, processing returns back to the step 310 for choosing another unprocessed article. Otherwise, processing proceeds to a step 320, where the system chooses a first section of the article (which coincides with the whole article if the article includes only one section—see, for example, the article 180 in FIG. 1). After the step 320, processing proceeds to a step 325, where the system estimates text length in a current section of an article. After the step 325, processing proceeds to a test step 330, where it is determined whether an amount of text in the current section is sufficient to extract one or more fragments from the current section. If so, processing proceeds to a step 335, where the system calculates a number and lengths of fragments, as explained elsewhere herein and illustrated, for example, in FIG. 1. After the step 335, processing proceeds to a step 340, where the system extracts fragments from the current section of the chosen article. After the step 340, processing proceeds to a step 345, where the system updates a similarity relation between the fragments, as explained, in particular, in FIG. 2 and the accompanying text. After the step 345, processing proceeds to a step 350, where the system updates a fragment count by adding an incremental count of fragments extracted at the step 340. After the step 350, processing proceeds to a test step 355, where it is determined whether the current article has more sections. Note that the test step 355 may be reached directly from the test step 330 if it is determined at the test step 355 that the current section's length is insufficient to extract fragment(s). If it is determined at the step 355 that the current article has more sections, processing proceeds to a step 360, where the system chooses the next section. After the step 360, processing proceeds back to the step 325. If it is determined at the test step 355 that there are no more sections in the current article, processing proceeds to a test step 365, where it is determined whether more fragments are needed, as explained elsewhere herein (for example, by comparing the fragment count calculated at the step 350 with the desired size of the training set). If so, processing proceeds back to the step 310 to choose a new unprocessed article from an available information source; otherwise, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Capturing of raster images may be done using smartphones, tablets and other mobile devices with embedded cameras, as well as conventional cameras, scanners and other hardware.

Software implementations of the system described herein may include executable code that is stored in a computer readable medium and executed by one or more processors, including one or more processors of a desktop computer. The desktop computer may receive input from a capturing device that may be connected to, part of, or otherwise in communication with the desktop computer. The desktop computer may include software that is pre-loaded with the device, installed from an app store, installed from media such as a CD, DVD, etc., and/or downloaded from a Web site. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of selecting data from a text corpus for training a semantic data analysis system, comprising:
    selecting an item of the text corpus, wherein the item includes at least one section;
    extracting a section of the at least one section of the item;
    determining a length of the section of the at least one section of the item;
    based on the length of the section being greater than a predetermined amount, subdividing the section into a plurality of fragments, wherein each fragment of the plurality of fragments is deemed to be similar to each other; and
    building a training set based on the plurality of fragments, wherein the training set is used to train the semantic data analysis system.

2. The method of claim 1, wherein building the training set includes:
    updating a similarity relation between each fragment in the training set; and
    updating a fragment count of the training set.

3. The method of claim 2, further comprising:
    after updating the fragment count of the training set, comparing the fragment count with a predetermined fragment value; and
    in accordance with a determination that the fragment count is below the predetermined fragment value, selecting another item of the text corpus.

4. The method of claim 1, wherein the item is a first item and the plurality of fragments is a first plurality of fragments; and
    the method further comprises:
        selecting a second item of the text corpus, wherein the second item includes at least one section;
        extracting a section of the at least one section of the second item;
        determining a length of the section of the at least one section of the second item;
        based on the length of the section being greater than a predetermined amount, subdividing the section into a second plurality of fragments, wherein:
            each fragment of the second plurality of fragments is deemed to be similar to each other, and
            each fragment of the second plurality of fragments is deemed to be dissimilar to each fragment of the first plurality of fragments, and
        including the second plurality of fragments in the training set.

5. The method of claim 4, further comprising:
    after including the second plurality of fragments in the training set, updating a similarity relation between each fragment in the training set; and
    updating a fragment count of the training set.

6. The method of claim 5, further comprising:
    after updating the fragment count of the training set, comparing the fragment count with a predetermined fragment value; and
    in accordance with a determination that the fragment count satisfies the predetermined fragment value, forgo selecting another item of the text corpus.

7. The method of claim 1, further comprising:
    determining whether the item includes another section;
    in accordance with a determination that the item includes another section, extracting the other section of the item;
    based on the length of the other section being greater than a predetermined amount, subdividing the other section into another plurality of fragments, wherein each fragment of the other plurality of fragments is deemed to be similar to each other and deemed to be of undefined similarity with regard to the plurality of fragments; and
    including the other plurality of fragments in the training set.

8. The method of claim 1, wherein the predetermined amount is approximately twice a size of a fragment.

9. The method of claim 8, wherein a fragment has approximately 100 words.

10. The method of claim 9, wherein a fragment has between 40 and 60 words.

11. The method of claim 1, further comprising ignoring one or more sections of the at least one section having a length less than the predetermined amount.

12. The method of claim 1, wherein the item is an article.

13. The method of claim 1, wherein similar fragments are semantically similar.

14. A computer server system for selecting data from a text corpus for training a semantic data analysis system, the computer server system comprising:
    one or more processors; and
    memory storing one or more instructions that, when executed by the one or more processors, cause the computer server system to perform operations including:
        selecting an item of the text corpus, wherein the item includes at least one section;
        extracting a section of the at least one section of the item;
        determining a length of the section of the at least one section of the item;
        based on the length of the section being greater than a predetermined amount, subdividing the section into a plurality of fragments, wherein each fragment of the plurality of fragments is deemed to be similar to each other; and
        building a training set based on the plurality of fragments, wherein the training set is used to train the semantic data analysis system.

15. The computer server system of claim 14, wherein building the training set includes:
    updating a similarity relation between each fragment in the training set; and
    updating a fragment count of the training set.

16. The computer server system of claim 15, further comprising instructions that, when executed by the one or more processors, cause the computer server system to perform operations including:
    after updating the fragment count of the training set, comparing the fragment count with a predetermined fragment value; and
    in accordance with a determination that the fragment count is below the predetermined fragment value, selecting another item of the text corpus.

17. The computer server system of claim 14, further comprising instructions that, when executed by the one or more processors, cause the computer server system to perform operations including:
    determining whether the item includes another section;
    in accordance with a determination that the item includes another section, extracting the other section of the item;
    based on the length of the other section being greater than a predetermined amount, subdividing the other section into another plurality of fragments, wherein each fragment of the other plurality of fragments is deemed to be similar to each other and deemed to be of undefined similarity with regard to the plurality of fragments; and including the other plurality of fragments in the training set.

18. A non-transitory computer readable storage medium configured to select data from a text corpus for training a semantic data analysis system, the non-transitory computer readable storage medium comprising instructions which, when executed on at least one processor, cause the at least one processor to:

select an item of the text corpus, wherein the item includes at least one section;

extract a section of the at least one section of the item;

determine a length of the section of the at least one section of the item;

based on the length of the section being greater than a predetermined amount, subdivide the section into a plurality of fragments, wherein each fragment of the plurality of fragments is deemed to be similar to each other; and build a training set based on the plurality of fragments, wherein the training set is used to train the semantic data analysis system.

19. The non-transitory computer readable storage medium of claim 18, wherein building the training set includes:

updating a similarity relation between each fragment in the training set; and updating a fragment count of the training set.

20. The non-transitory computer readable storage medium of claim 18, further comprising instructions which, when executed on at least one processor, cause the at least one processor to:

after updating the fragment count of the training set, compare the fragment count with a predetermined fragment value; and in accordance with a determination that the fragment count is below the predetermined fragment value, select another item of the text corpus.

* * * * *